Patented June 20, 1933

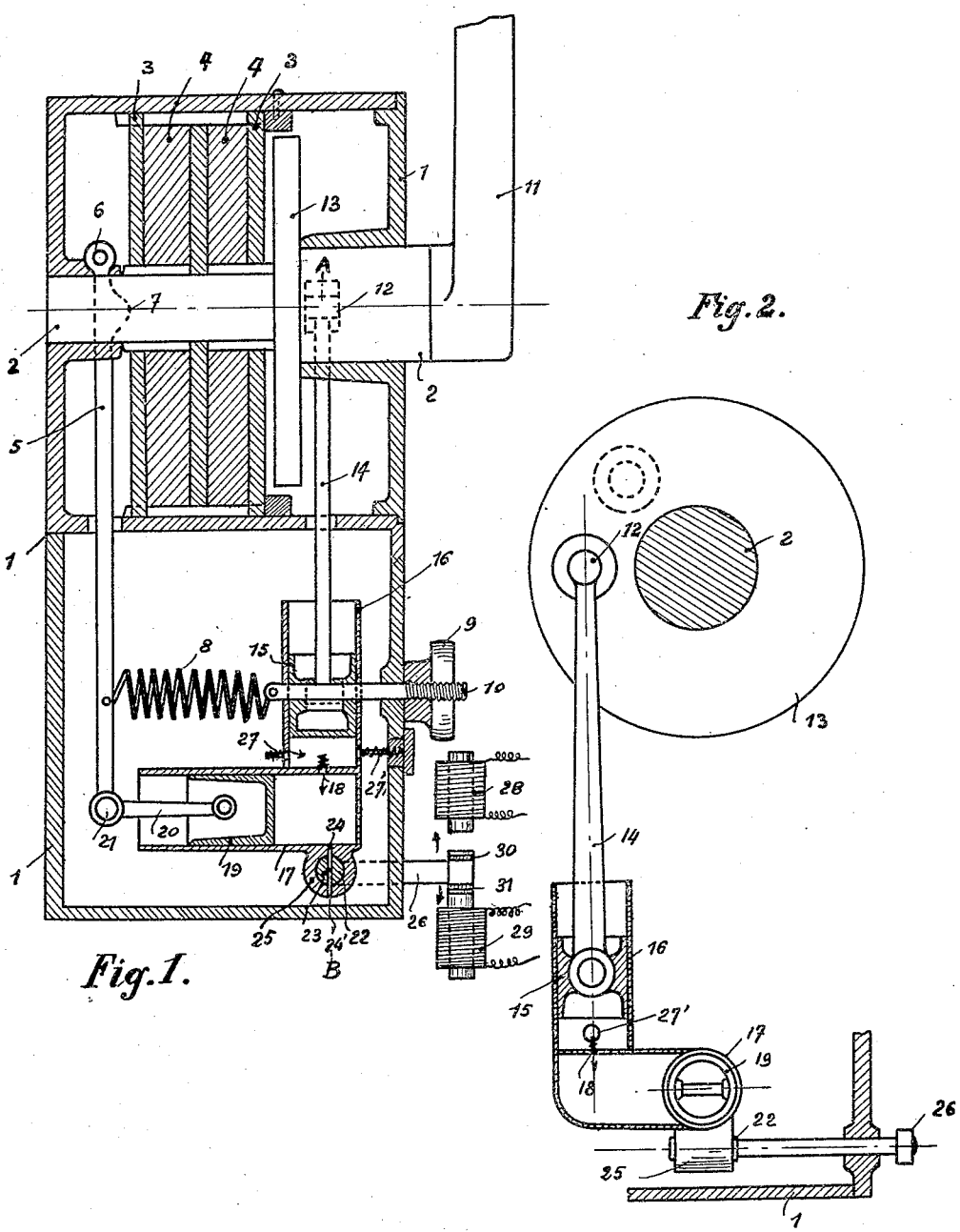

1,914,492

UNITED STATES PATENT OFFICE

ARMAND DUFAUX, OF LEVALLOIS PERRET (SEINE), FRANCE

LIQUID AND FRICTION SHOCK ABSORBER FOR AUTOMOBILES

Application filed September 24, 1931, Serial No. 564,849, and in France October 31, 1930.

Shock absorbers of the friction type and liquid shock absorbers each have their own qualities and faults. Their reciprocal qualities can be summarized as follows:—

Friction shock absorbers give a better hold on the road at high speeds, whilst liquid shock absorbers assure a more gentle and pleasant suspension at low speeds.

The present invention consists in a shock absorber combining these two systems, each being utilized at the most advantageous time, the shock absorber being able to operate either on one, or on the other system, for instance by displacing a handle or other suitable member located within reach of the driver, or this result can be obtained by automatic control in connection with a suitable part of the vehicle, and in any event in such a manner that the effect of the shock absorber is proportional, either to the speed, or the force or the frequency of the shocks.

In the method of carrying the invention into effect which is given by way of example, the pressure in the interior of the liquid shock absorber when it is in operation, is utilized to act differentially with a clamping member for friction discs, in such a way that it is only necessary to cause the pressure to fall by operating a cock or valve to bring by this single action the friction shock absorber into action (working by a previously set clamping according to the regulating organ common to all shock absorbers of this kind), and suppressing the effects of the liquid shock absorber. The reverse action brings the liquid shock absorber into action and frees the friction shock absorber.

The annexed drawing shows one method of constructing a combined shock absorber according to the invention.

In the drawing, Fig. 1 is a sectional elevation of the combined shock absorber, and Fig. 2 is a section of the liquid shock absorber on the line A—B Fig. 1, with parts omitted for clearness.

The casing 1, of the combined shock absorber, is fixed to the chassis of the automobile in any suitable manner and carries at its upper part a grooved axle 2 on which are slidden the discs 3 and the friction elements 4 adapted to turn on the said axle. A lever 5 pivoted on the fixed axle 6 and having a curved extremity in the form of a semi-cylindrical fork coming around the axle 2, is formed with projections 7 which act on the friction elements as shown. To this end, a spring 8 is provided regulatable by means of a nut 9 and a threaded rod 10, to vary or set the degree of clamping of the friction elements.

The arm 11 of the combined shock absorber which is adapted to be fixed to the movable part in connection with the axle-tree and which is connected with the axle 2 of the friction shock absorber, carries a plate 13 provided with an eccentric pin 12 to which is pivotally attached the rod 14 of a piston 15 displaceable in a vertical cylinder 16. This latter communicates with a second and horizontal cylinder 17 by means of a valve 18. The piston 19 of the cylinder 17 is connected to the extremity of the lever 5 by means of a rod 20 pivoting at 21. The cylinder 17 communicates with the interior of the casing 1 by means of a rotary bush or plug 22 provided with a passage 23 corresponding to the orifices 24 and 24' pierced in the body of the cock 25 thus formed. A lever 26 controls the opening or closing of the said bush or plug 22 in order to allow the fluid employed to escape from the interior of the cylinder 17 or to be retained there. A valve 27 allows the re-entry of the fluid contained in the interior of the casing as will be hereafter described.

After having regulated the degree of clamping of the spring 8 by means of the nut 9, the combined shock absorber functions in the following manner:

If it is desired to run at high speed, the lever 26 is brought into position to maintain open the bush or plug 22, and the fluid shock absorber in thus put out of action, that is to say that the fluid can pass directly from the cylinder 16 into the cylinder 17 and leave this latter by the orifices 24 and 24' of the cock 25. Only the spring 8 acts through the intermediary of the lever 5 on the friction elements.

If now it is desired to run at reduced speed, the bush or plug 22 is closed, and the fluid shock absorber commences to function. The shocks to which the vehicle is subjected actuate the piston 15 and the fluid contained in the casing is drawn into the cylinder 16 by the valve 27. At each descending movement of the piston, the oil passes into the cylinder 17 by the valve 18, fills this latter and drives the piston 19 towards the left which "unclamps" the friction shock absorber.

A regulating valve 27' conveniently located and loaded regulates in a precise manner the running of the fluid shock absorber.

The invention also includes an electromagnetic arrangement for the operation of the lever 26 of the bush or plug 22. This arrangement is constituted by two electromagnets 28 and 29 the armatures 30 and 31 of which are fixed to the extremity of the lever 26. A commutator placed within reach of the driver when suitably operated, causes a current to be passed to one or other of the electro-magnets in order to close or open the passage 23 of the bush or plug 22.

What I claim and desire to secure by Letters Patent of the United States of America is:—

1. A combined friction and liquid shock absorber for automobile vehicles, comprising a friction shock absorber and a liquid shock absorber, common means connecting both shock absorbers to the movable part in connection with the axle of the vehicle so as to impart the said movements to the shock absorbers, means for clamping the friction parts of the friction shock absorber together, spring means for regulating the degree of clamping of the friction parts of the shock absorber, a cylinder in connection with the liquid shock absorber and adapted to receive pressure fluid therefrom, a piston working in said cylinder and operatively connected with the means for clamping the friction parts of the friction shock absorber together, a valve in said cylinder adapted on the one hand to confine the pressure fluid therein and on the other hand to permit the escape therefrom, and means for controlling the opening and closing of the said valve, for the purposes set forth.

2. A combined friction and liquid shock absorber for automobile vehicles, comprising a friction shock absorber and a liquid shock absorber, common means connecting both shock absorbers to the movable part in connection with the axle of the vehicle so as to impart the said movements to the shock absorbers, means for clamping the friction parts of the friction shock absorber together, spring means for regulating the degree of clamping of the friction parts of the shock absorber, a cylinder in connection with the liquid shock absorber and adapted to receive pressure fluid therefrom, a piston working in said cylinder and operatively connected with the means for clamping the friction parts of the friction shock absorber together, a valve in said cylinder adapted on the one hand to confine the pressure fluid therein and on the other hand to permit the escape therefrom, and automatic means for controlling the opening and closing of the said valve, for the purposes set forth.

3. A combined friction and liquid shock absorber for automobile vehicles, comprising a friction shock absorber and a liquid shock absorber, common means connecting both shock absorbers to the movable part in connection with the axle of the vehicle so as to impart the said movements to the shock absorbers, means for clamping the friction parts of the friction shock absorber together, spring means for regulating the degree of clamping of the friction parts of the shock absorber, a cylinder in connection with the liquid shock absorber and adapted to receive pressure fluid therefrom, a piston working in said cylinder and operatively connected with the means for clamping the friction parts of the friction shock absorber together, a valve in said cylinder adapted on the one hand to confine the pressure fluid therein and on the other hand to permit the escape therefrom, and electro-mechanical means for controlling the opening and closing of the said valve, for the purposes set forth.

4. A combined friction and liquid shock absorber for automobile vehicles, comprising a casing, a shaft mounted across the upper portion of said casing, friction discs on said shaft and in connection with the shaft and with the casing, a lever operatively connected to the shaft and to the movable part in connection with the axle of the vehicle, so as to impart the said movements to the said shaft, a lever with a forked end partly surrounding the said shaft and pivoted to the said casing and having projections for engaging with the friction discs, a disc on the said shaft, an eccentric pin on the said disc, a rod pivotally connected at one end to the eccentric pin and carrying a piston at the other end, a cylinder in which the said piston works, the said cylinder being located in the interior of the lower portion of the casing, a one-way valve between the interior of the casing and the interior of the said cylinder, a pressure-relief valve in said cylinder, another cylinder in communication with the first-mentioned cylinder, through a one-way valve, a second piston slidably mounted in the second-mentioned cylinder, a piston rod pivotally connected to this second piston at one end and at the other end connected to the free end of the before mentioned forked lever, a valve in the second-mentioned cylinder, a plug with a passageway therethrough in said valve and adapted to place the interior of the second-mentioned cylinder into communication with the interior of the casing through apertures in the valve casing, and a lever operatively connected to said plug, all for the purposes set forth.

5. A combined friction and liquid shock absorber for automobile vehicles, comprising a casing, a shaft mounted across the upper portion of said casing, friction discs on said shaft and in connection with the shaft and with the casing, a lever operatively connected to the shaft and to the movable part in connection with the axle of the vehicle, so as to impart the said movements to the said shaft, a lever with a forked end partly surrounding the said shaft and pivoted to the said casing and having projections for engaging with the friction discs, a screwed rod passing through said casing, a spring between said screwed rod and the said forked lever, a nut on the rod for regulating the tension of the spring, a disc on the said shaft, an eccentric pin on the said disc, a rod pivotally connected at one end to the eccentric pin and carrying a piston at the other end, a cylinder in which the said piston works, the said cylinder being located in the interior of the lower portion of the casing, a one-way valve between the interior of the casing and the interior of the said cylinder, a pressure-relief valve in said cylinder, another cylinder in communication with the first-mentioned cylinder through a one-way valve, a second piston slidably mounted in the second-mentioned cylinder, a piston rod pivotally connected to this second piston at one end and at the other end connected to the free end of the before-mentioned forked lever, a valve in the second-mentioned cylinder, a plug with a passageway therethrough in said valve and adapted to place the interior of the second-mentioned cylinder into communication with the interior of the casing through apertures in the valve casing, and a lever operatively connected to said plug, all for the purposes set forth.

6. A shock absorber for automobile vehicles, comprising a friction shock absorbing element and a liquid shock absorbing element, common means connecting both said shock absorbing elements to the movable axle of the vehicle, and means for rendering the said shock absorbing elements operative alternately.

7. A shock absorber comprising a friction shock absorbing element, a liquid shock absorbing element, common means connecting both said shock absorbing elements to the movable axle of the vehicle, valve means associated with the liquid shock absorbing element to render same inoperative, and means whereby the pressure produced in said liquid shock absorbing element is utilized to cause said friction absorbing element to be rendered inoperative.

8. A shock absorber for automobile vehicles, comprising a friction shock absorbing element and a hydraulic absorbing element, a clutch between the friction shock absorbing element and a moving part of the shock absorber, and means for controlling this clutch by the hydraulic pressure produced in the hydraulic absorbing element.

9. A shock absorber according to claim 8, wherein the hydraulic pressure produced in the hydraulic shock absorber effects declutching of the friction shock absorbing element from the moving part by means of a cable, connecting rod or the like.

In witness whereof I affix my signature.

ARMAND DUFAUX.